(12) United States Patent
Smith et al.

(10) Patent No.: US 12,281,720 B2
(45) Date of Patent: Apr. 22, 2025

(54) SPOOL VALVE ACTUATOR

(71) Applicant: Huntington Ingalls Incorporated, Newport News, VA (US)

(72) Inventors: Charles Smith, Newport News, VA (US); Stephen Hollowood, Newport News, VA (US)

(73) Assignee: Huntington Ingalls Incorporated, Newport News, VA (US)

( * ) Notice: Subject to any disclaimer, the term of this patent is extended or adjusted under 35 U.S.C. 154(b) by 6 days.

(21) Appl. No.: 18/379,977

(22) Filed: Oct. 13, 2023

(65) Prior Publication Data

US 2024/0288089 A1 Aug. 29, 2024

Related U.S. Application Data

(60) Provisional application No. 63/418,054, filed on Oct. 21, 2022.

(51) Int. Cl.
*F16K 31/163* (2006.01)
*F16K 11/07* (2006.01)

(52) U.S. Cl.
CPC ........ *F16K 31/163* (2013.01); *F16K 11/0704* (2013.01)

(58) Field of Classification Search
CPC ............................ F16K 31/163; F16K 11/0704
See application file for complete search history.

(56) References Cited

U.S. PATENT DOCUMENTS

| | | | |
|---|---|---|---|
| 2017/0292626 A1* | 10/2017 | Zhang | F16J 15/3452 |
| 2019/0277413 A1* | 9/2019 | Li | F16K 11/0704 |
| 2022/0107028 A1* | 4/2022 | Stanhope | F01L 1/3442 |

* cited by examiner

*Primary Examiner* — Kelsey E Cary
(74) *Attorney, Agent, or Firm* — Hunton Andrews Kurth LLP

(57) ABSTRACT

A spool valve actuator may include a stop fixed to the case with a cylindrical body member having a first set of slots of a first length at regular circumferential distances and a second set of slots of a second length at regular circumferential distances offset from the first set of slots, both set of slots configured to slidably receive a proximal portion of a positioner, a ratchet member may comprise, a cylindrical body slidably attached to the spool valve shaft and keyed to the stop to prevent relative rotation, a distal edge comprising a plurality of distally facing teeth configured to engage the proximal portion of the positioner when the ratchet is moved away from the stop, the positioner may comprise a plurality of proximally extending positioning members configured to engage with both the distally facing teeth and the slots in the stop.

21 Claims, 8 Drawing Sheets

SPOOL VALVE ACTUATOR

CROSS REFERENCE TO RELATED APPLICATION(S)

This application relates to and claims the benefit of priority from U.S. Provisional Patent Application No. 63/418,054, filed Oct. 21, 2022, the entire disclosure of which is incorporated herein by reference in its entirety.

GOVERNMENT SUPPORT

This invention was made with government support under Contract No. N00024-19-D-4306 awarded by the Department of the Navy. The government has certain rights in the invention.

FIELD OF THE DISCLOSURE

The present disclosure relates to a spool value actuator and a method for actuating a spool valve without requiring constant hydraulic or pneumatic pressure. This application relates generally to valve actuation and, in particular, to a spool valve actuator that does not require continuous hydraulic pressure to hold the valve in place against operational pressure.

BACKGROUND INFORMATION

The use of spool valves is common in hydraulics, with numerous operational mechanisms. The general concept, of the spool valve is that it is movable between two or more axial positions where each position produces a different routing of flow through the valve. While many configurations are possible, the present invention will be discussed in the context of the exemplary valve 5 shown in FIGS. 1a and 1b. The spool valve 5 has a housing 20 that is typically cylindrical and has a cylindrical interior cavity 22 in which a cylindrical spool 10 is slidably disposed. The housing defines first and second flow passageways 24, 26. The spool is configured with first and second channels 14, 16, which can each be selectively aligned with the flow passageways 24, 26 by sliding the spool 10 along the spool axis 90, thereby providing two different flow paths through the valve 5. FIG. 1a illustrates a first flow configuration in which the first channel 14 is aligned with the passageways 24, 26 and FIG. 1b illustrates a second flow configuration in which the second channel 16 is aligned with the passageways 24, 26.

The spool valve 5 is operated by selectively moving the spool 10 between the positions shown in FIG. 1a and 1b and maintaining the selected position during flow operation. In the first or proximal-most position, the proximal end of the spool 10 is in contact with a shoulder 29. In typical hydraulic operations, moving the spool 10 in the distal direction toward the second position requires the countering of hydraulic pressure in the cavity volume 28 distal to the spool 10. This may be accomplished either by providing an axial force to the spool 10 through the spool shaft 12 or by introducing a countering hydraulic pressure to the cavity volume 27 proximal to the spool 10. In either case, once the spool 10 has moved from the proximal position to the distal position of FIG. 1b, a countering force must be maintained to hold the spool 10 in the new position.

Existing solutions to maintaining spool position against a strong hydraulic force in valves of this type are to either maintain a constant countering hydraulic force or to incorporate a locking mechanism that holds the spool in place. In many instances, however, these solutions are impractical or unsafe or both.

SUMMARY OF EXEMPLARY EMBODIMENTS

The following is intended to be a brief summary of the exemplary embodiments of the present disclosure, and is not intended to limit the scope of the exemplary embodiments.

An embodiment of the present invention provides a spool valve actuating device (actuator) that uses a ratcheting mechanism attachable to the spool shaft and a multiple position stop to hold the spool in desired positions. Hydraulic pressure may be used to move the spool in the distal direction. As the spool moves, a combination of positioning and indexing mechanisms cause a positioner to rotate between rotational positions that correspond to desired axial locations of the spool. Once the correct stop has indexed into position, the countering hydraulic force used to move the spool is released. The countering force is maintained against the operational hydraulic force by the stop.

In some aspects, the techniques described herein relate to a spool valve actuator, including: a cylindrical actuator case connected to a proximal end of a spool valve and coaxially with a spool axis and configured to house an indexing mechanism and a main spring each oriented coaxially with the spool axis and having passage for a spool valve shaft along the spool axis, the indexing mechanism including: a stop including: a disc-shaped base member and a distally extending cylindrical body member, the base member fixedly attached to a proximal end of the cylindrical actuator case; an internal passageway in the body member configured to slidably receive a ratchet member; a first set of slots of a first length in the body member at regular circumferential distances; a second set of slots of a second length in the body member at regular circumferential distances offset from the first set of slots; and both the first and second set of slots configured to slidably receive a proximal portion of a positioner; the ratchet member including; a cylindrical body slidably attached to the spool valve shaft, disposed within the stop, and keyed to the stop to prevent relative rotation between the ratchet member and the stop; a distal edge including a plurality of distally facing teeth configured to engage the proximal portion of the positioner when the ratchet is moved in a distal direction along the spool axis; the positioner; a base portion configured to engage an inside wall of the cylindrical actuator case; and a proximal edge including a plurality of extending positioning members configured to engage with both the distally facing teeth of the ratchet member and the first and second sets of slots in the stop.

In some aspects, the techniques described herein relate to a spool valve actuator, wherein the base portion of the positioner is configured for slidable translation and rotation within the cylindrical actuator case.

In some aspects, the techniques described herein relate to a spool valve actuator, wherein a resting state includes the extending positioning members of the positioner engaged with either the first or second set of slots in the stop.

In some aspects, the techniques described herein relate to a spool valve actuator, wherein upon activation of the spool valve, the ratchet member extends distally upon the spool valve axis until the distally facing teeth of the ratchet member engage the plurality of positioning members, causing the plurality of positioning members to disengage the first or second set of slots on the stop.

In some aspects, the techniques described herein relate to a spool valve actuator, wherein engagement of the extending positioning members of the positioning member with the distally facing teeth of the ratchet member is configured to cause sliding of the surfaces against each other, further causing the positioning member to rotate relative to the stop.

In some aspects, the techniques described herein relate to a spool valve actuator, wherein the rotation of the positioning member is sufficient to align the positioning members of the positioner with the opposite of the first or second stop slot from where the positioner was oriented upon activation of the spool valve.

In some aspects, the techniques described herein relate to a spool valve actuator, wherein upon a deactivation of the spool valve, the positioning members of the positioner slide into contact with a next indexed slot of the stop.

In some aspects, the techniques described herein relate to a spool valve actuator, further including a stop collar fixedly mounted to the spool valve shaft and configured to prevent relative axial motion between the positioner and the spool valve shaft.

In some aspects, the techniques described herein relate to a spool valve actuator, wherein the ratchet member and positioner further include: a ratchet spring installed coaxially with the spool valve axis and between adjacent portions of the ratchet member and positioner.

In some aspects, the techniques described herein relate to a spool valve actuator, wherein the ratchet spring is configured to provide a bias force sufficient to maintain physical separation between the ratchet member and the positioner.

In some aspects, the techniques described herein relate to a spool valve actuator, wherein the ratchet member is positioned such that the distally facing teeth are rotated by one-half of a tooth pitch relative to the positioner when the positioner is engaged with either the first or second set of slots in the stop.

In some aspects, the techniques described herein relate to a spool valve actuator, further comprising one or more additional set of stop slots, each of the one or more additional set of stop slots having a unique length in the body member at regular circumferential distances offset from the first set of slots, the second set of slots, and any other of one or more additional set of stop slots.

In some aspects, the techniques described herein relate to a method for activating and locking a spool valve, including: applying a working force to spool valve; translating the working force, through a spool valve shaft attached to the spool valve, to a spool valve actuator in a cylindrical actuator case connected to a proximal end of the spool valve and coaxially with a spool axis, and including an indexing mechanism and main spring; moving the spool valve shaft in a distal direction along the spool axis, such axial movement causing: moving of a ratchet member slidably attached to the spool valve shaft in the distal direction along the spool axis, away from a stop fixed to a proximal end of the cylindrical actuator case, wherein the ratchet member is keyed to the stop to prevent relative rotation between the ratchet member and the stop; engaging, via the moving of the ratchet member, a distal edge of the ratchet member including a plurality of distally facing teeth with a proximal portion of a positioner, the proximal portion including a plurality of extending positioning members configured to engage the distally facing teeth of the ratchet member; moving, as a result of the engagement of the ratchet member and positioner, the positioner in the distal direction along the spool axis and away from the stop; rotating, as a result of the engagement of the ratchet member and positioner, the positioner relative to the stop; moving, as a result of removal of the working force, the positioner in a proximal direction along the spool axis toward the stop; engaging, via the moving of the positioner in the proximal direction, the positioning members of the proximal portion with one of a first set of slots of a first length in the stop at regular circumferential distances and a second set of slots of a second length in the stop at regular circumferential distances offset from the first set of slots.

In some aspects, the techniques described herein relate to a method, wherein a base portion of the positioner is configured for slidable translation and rotation within the cylindrical actuator case.

In some aspects, the techniques described herein relate to a method, wherein a resting state includes the extending positioning members of the positioner engaged with either the first or second set of slots in the stop.

In some aspects, the techniques described herein relate to a method, wherein the moving, as a result of the engagement of the ratchet member and positioner, the positioner in the distal direction along the spool axis and away from the stop causes the plurality of positioning members to disengage the first or second set of slots on the stop.

In some aspects, the techniques described herein relate to a method, wherein the rotating, as a result of the engagement of the ratchet member and positioner, the positioner relative to the stop is sufficient to align the positioning members of the positioner with the opposite of the first or second stop slot from where the positioner was oriented upon applying the working force to spool valve.

In some aspects, the techniques described herein relate to a method, wherein upon removal of the working force the positioning members of the positioner slide into contact with a next indexed slot of the stop.

In some aspects, the techniques described herein relate to a method, wherein the ratchet member and positioner include a ratchet spring installed coaxially with the spool valve axis and between adjacent portions of the ratchet member and positioner and is configured to provide a bias force sufficient to maintain physical separation between the ratchet member and the positioner under a steady state.

In some aspects, the techniques described herein relate to a method, wherein the working force is sufficient to overcome the bias force and cause the engaging of the distal edge of the ratchet member with the proximal portion of the positioner.

In some aspects, the techniques described herein relate to a method, wherein the ratchet member is positioned such that the distally facing teeth are rotated by one-half of a tooth pitch relative to the positioner when the positioner is engaged with either the first or second set of slots in the stop.

BRIEF DESCRIPTION OF THE DRAWINGS

The invention can be more fully understood by reading the following detailed description together with the accompanying drawings, in which like reference indicators are used to designate like elements, and in which.

Figure 1A:
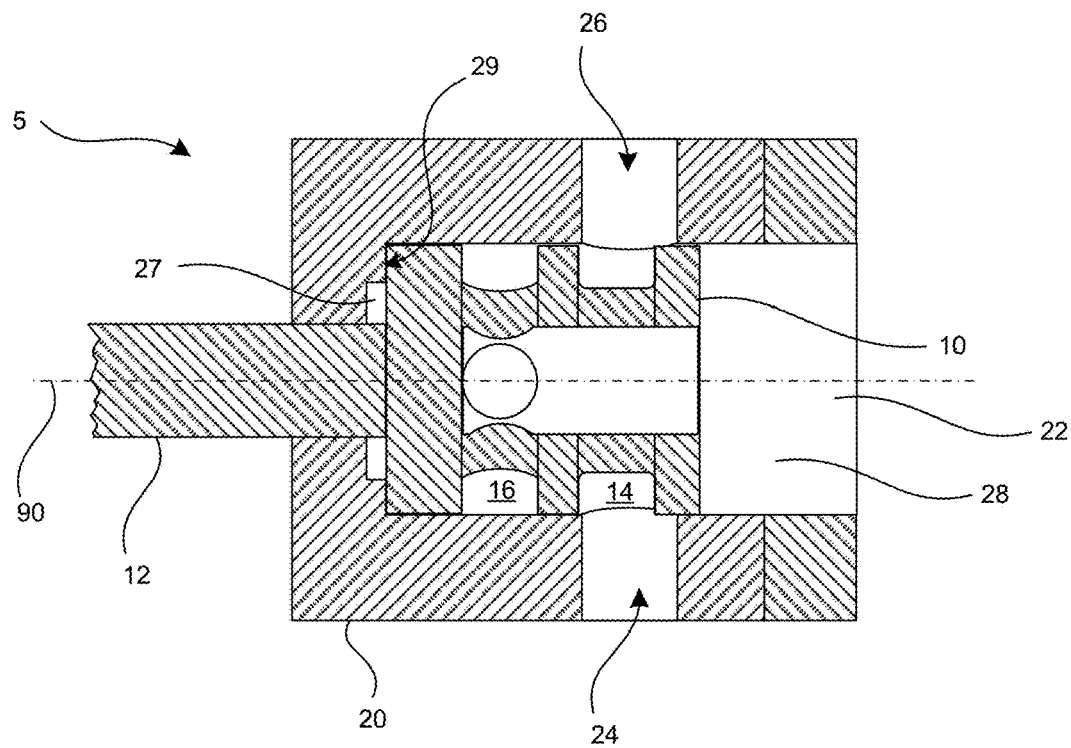
FIGS. 1a and 1b are section views of a prior art spool valve.
Figure 1B:
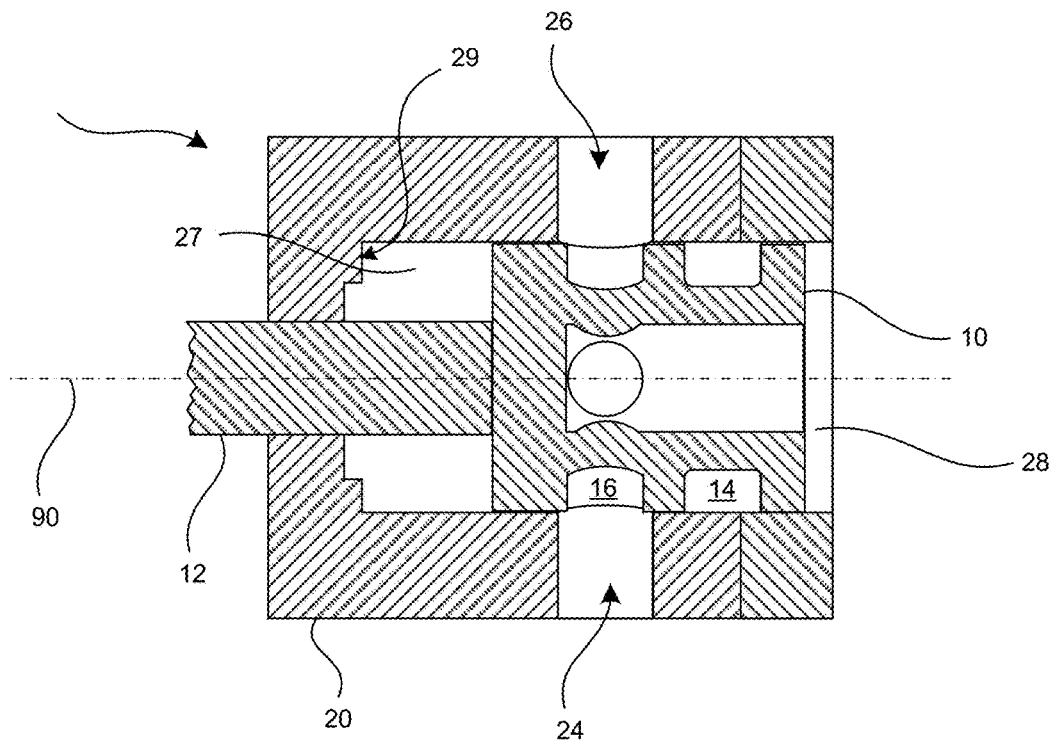

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended paragraphs.

DETAILED DESCRIPTION OF THE INVENTION

While the invention will be described in connection with particular embodiments, it will be understood that the invention is not limited to these embodiments. On the contrary, it is contemplated that various alternatives, modifications and equivalents are included within the spirit and scope of the invention as described.

An embodiment of the present invention is directed to a valve actuation mechanism that toggles a spool valve between two positions using only an intermittent hydraulic pressure. Continuous hydraulic pressure is not required to hold the spool valve in position once it is toggled to the desired position.

Figure 2:
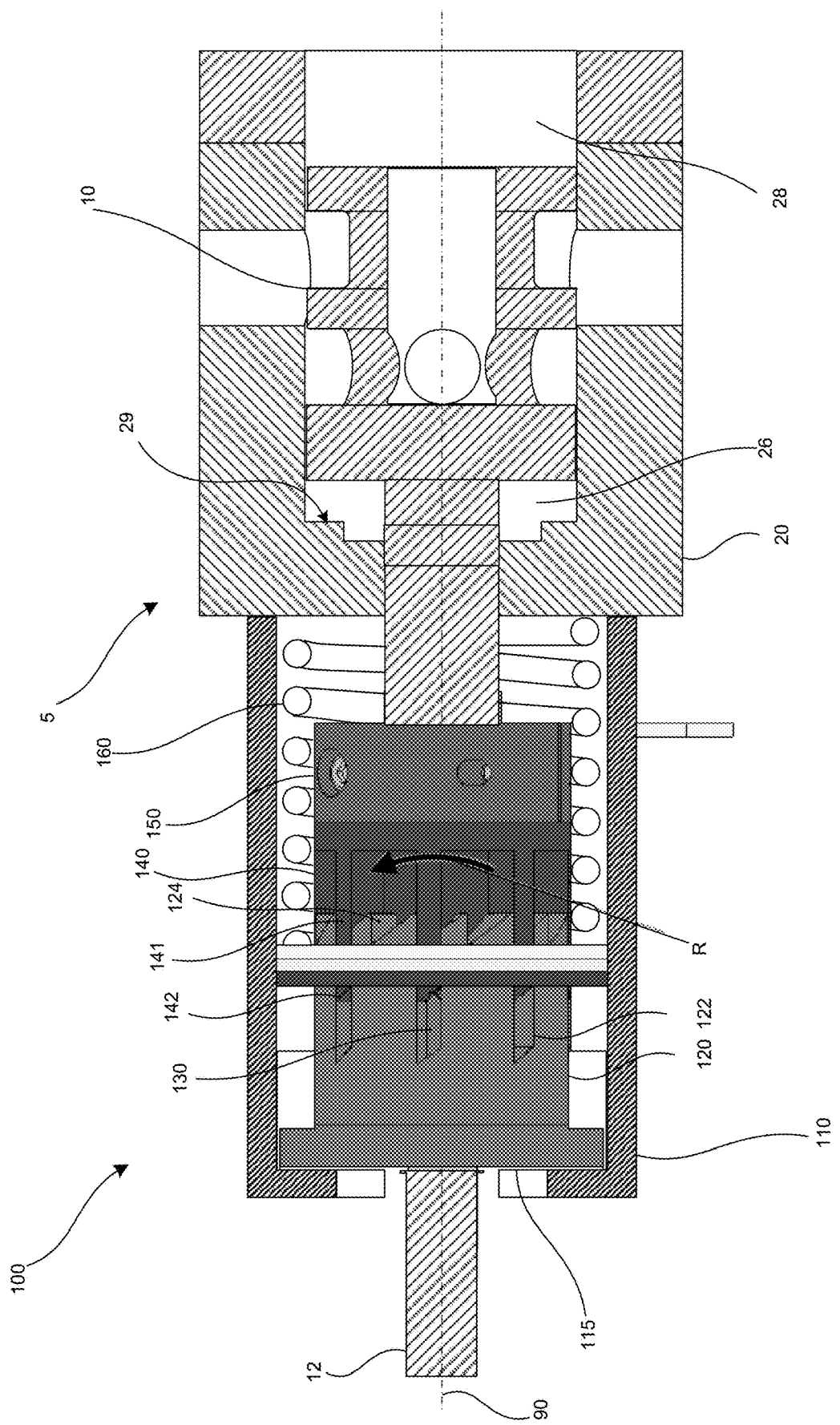
FIG. 2 is a partial section view of a spool valve actuator according to an embodiment of the invention.
Figure 3:
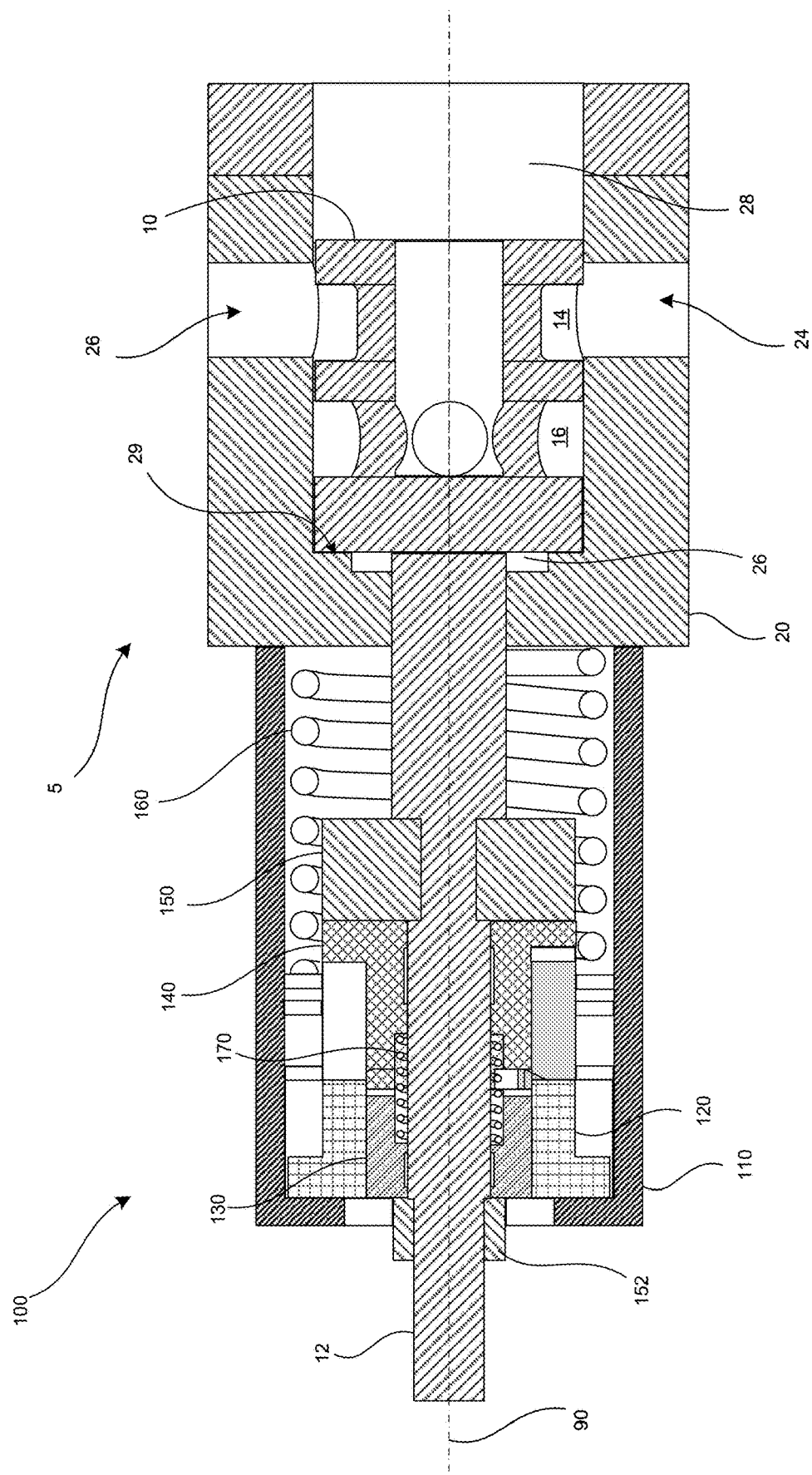
FIG. 3 is a full section view of a spool valve actuator according to an embodiment of the invention.

With reference to FIGS. 2 and 3, a spool valve actuator 100 according to an embodiment of the invention has an actuator case 110 in which is disposed a positioning and indexing mechanism 115. The indexing mechanism 115 is made up of a stop 120, a ratchet 130, a positioner 140, and a stop collar 150. Each of these components has a cylindrical passage configured for receiving the spool valve shaft 12. The stop 120 is fixedly attached to the cylindrical case 110. The ratchet 130 and the positioner 140 are slidably mounted to the to the spool valve shaft 12. The stop collar 150 and a retainer 152 are fixedly mounted to the spool valve shaft 12 so that they translate axially therewith. As best seen in FIG. 3, the passageway through the stop 120 is configured to slidably receive the ratchet 130 therein. The passageways of the ratchet 130 and the positioner 140 have adjacent portions with a greater diameter to receive a ratchet spring 170 that provides a biasing force tending to separate the ratchet 130 and the positioner 140.

Figure 6:
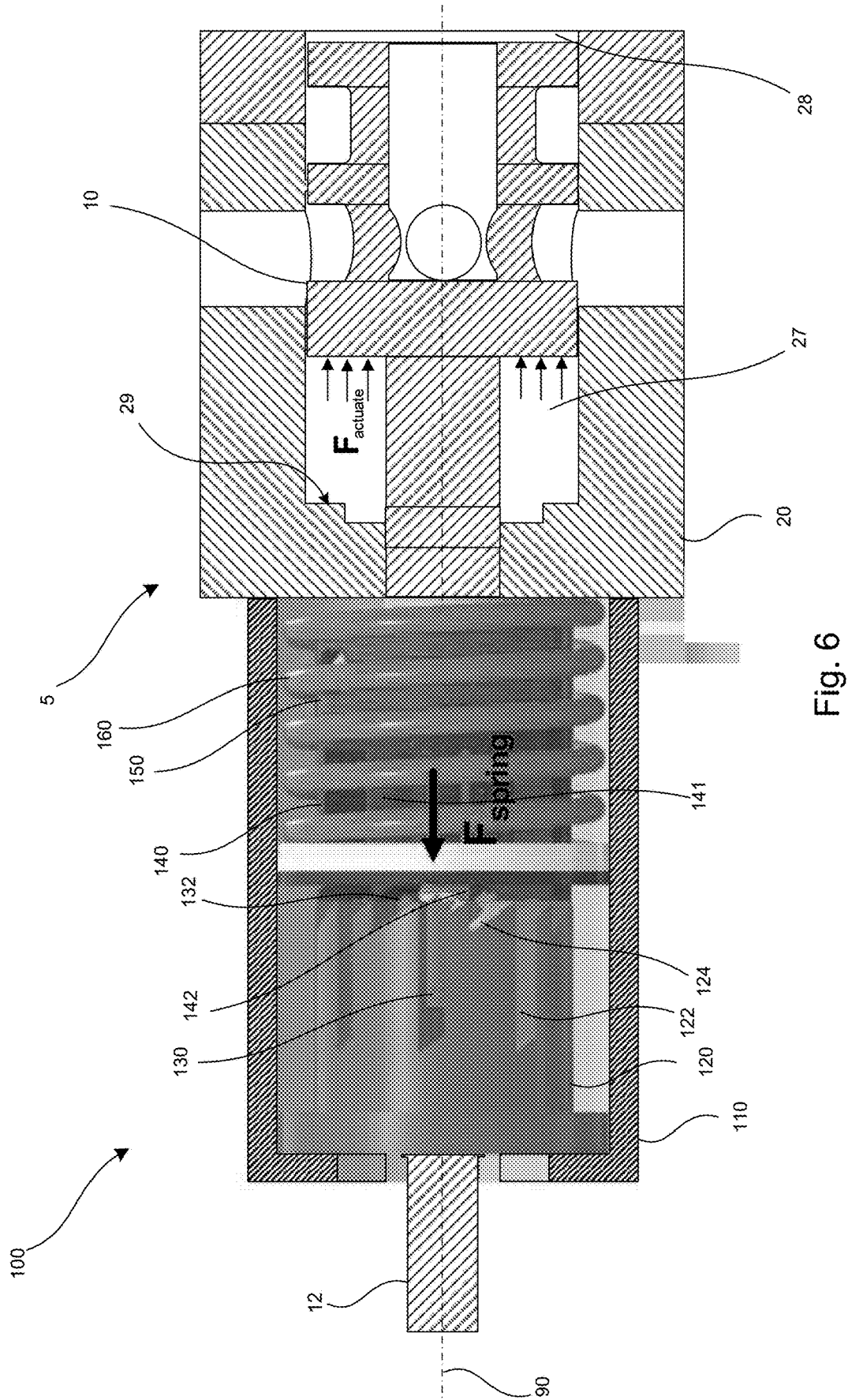
FIG. 6 is a partial section view of the spool valve actuator of FIG. 2 and the spool valve of FIG. 1 where the spool has translated to a distal-most position.

The ratchet 130 has a distally extending cylindrical body that terminates in a circumferential edge made up of distally facing teeth 132 (visible in FIG. 6). The ratchet 130 is keyed to the stop 120 to prevent relative rotation between these two components. The teeth 132 are configured to engage inclined surfaces 142 of proximally extending positioning members 141 of the positioner 140 and to cause the inclined surfaces 142 to slide along the surfaces of the ratchet teeth 132 thereby causing the positioner 140 to rotate (R) when the spool 110 has been actuated sufficiently to draw the ratchet 130 and positioner 140 clear of the stop 120. The ratchet 130 is rotated by half a tooth pitch relative to the positioner 140 when it is engaged in any of the slots of the stop 120 so that the positioner 140 can rotate about the ratchet 130 when it is clear of the stop 120.

Figure 4:
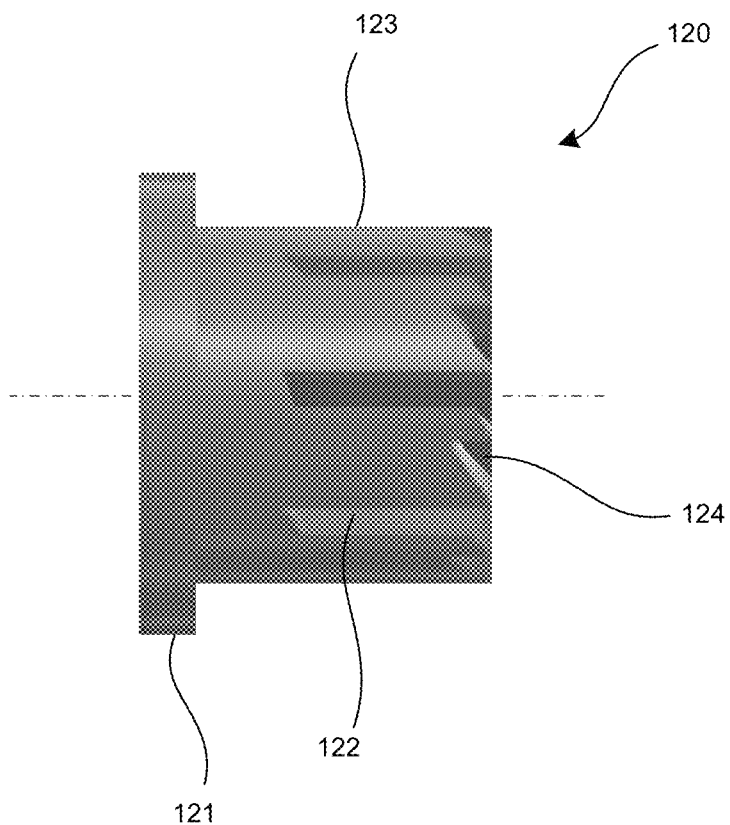
FIG. 4 is a side view of the stop mechanism of the spool valve actuator of FIG. 2.

As shown in FIG. 4, the stop 120 has a disc-shaped base member 121 and a distally extending cylindrical body member 123. A first set of slots 122 is cut into the stop body 123 at regular circumferential intervals. A second set of slots 124 is cut more shallowly into the stop body 123 at regular circumferential intervals intermediate the slots 122 of the first set. Each of slots 122, 124 is configured to correspond to and slidably receive at least a proximal portion of positioning member 141 of the positioner 140. When so received, the proximally facing inclined surface 142 of the positioning member 141 engages the base of the slot 122, 124, thereby preventing further proximal motion of the positioner 140 relative to the stop 120.

The positioner 140 has a base portion configured for engaging the interior wall of the cylindrical case 110 and for slidable translation and rotation there-within. A main spring 160 is positioned and configured for disposition between the positioner base portion and the proximal side of the spool valve case 20. This spring 160 serves to provide a biasing force on the positioner 140 away from the spool valve in the proximal direction.

Figure 5:
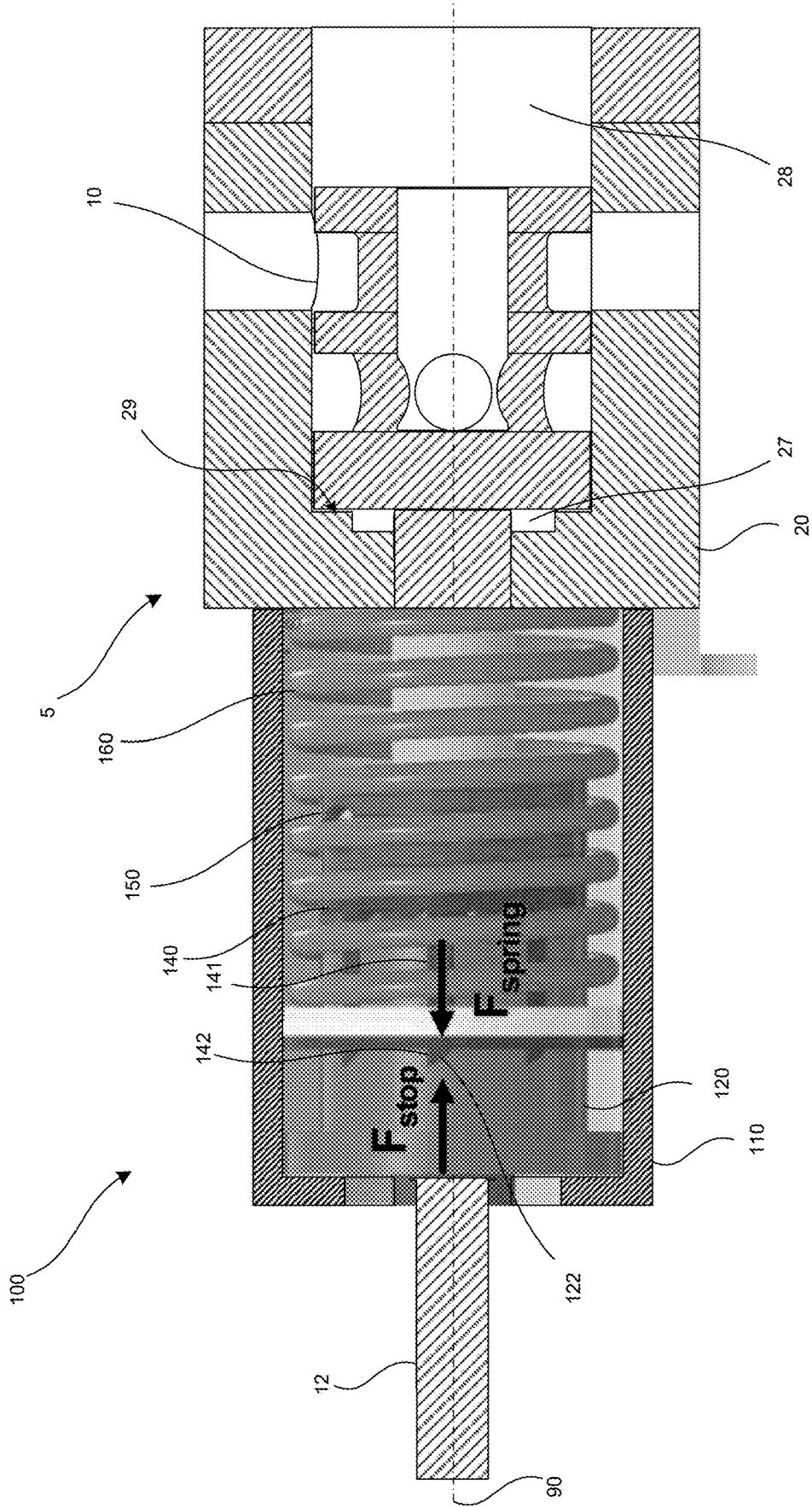
FIG. 5 is a partial section view of the spool valve actuator of FIG. 2 and the spool valve of FIG. 1 where the spool is in a first operational position.
Figure 7:
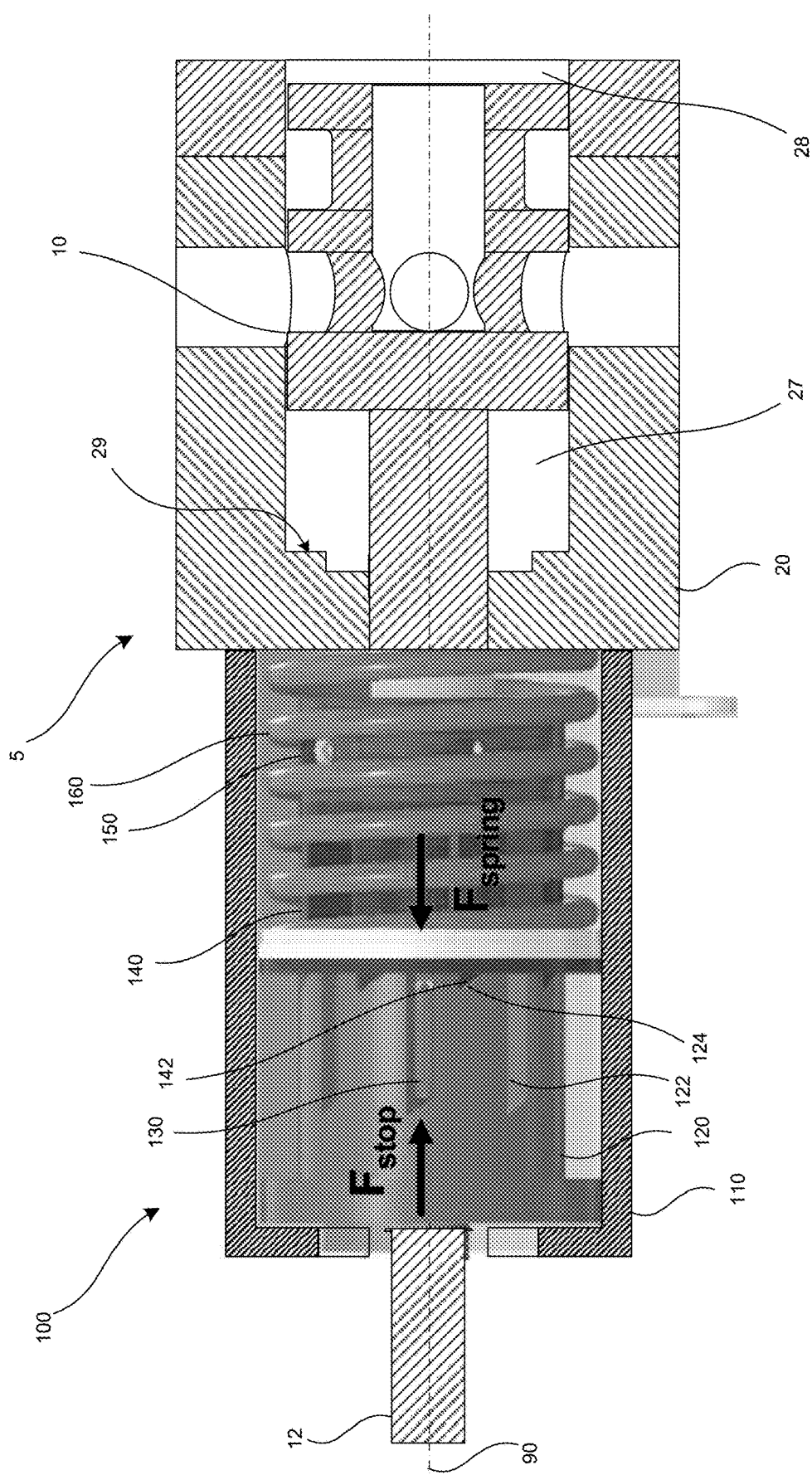
FIG. 7 is a partial section view of the spool valve actuator of FIG. 2 and the spool valve of FIG. 1 where the spool is in a second operational position.

FIGS. 5-7 illustrate the operation of the spool valve actuator 100. In FIG. 5, the spool valve 5 is in its first operational configuration in which the spool 10 is in a proximal position. In this configuration, the positioning members 141 of the positioner 140 are aligned with and received into the deeper slots 122 of the stop 120. A force Fspring is created by the main spring and acting on the positioner to keep it fully received in the slots of stop 120. There is a counter force Fstop meaning there is no relative motion when in the proximal position. As hydraulic pressure is applied to the actuation cavity 27 proximal to the spool 10, the spool 10 and the spool valve shaft 12 are forced to move in the distal direction. This causes the movable portions of the indexing mechanism 115 to move as well with the teeth 132 of the ratchet 130 engaging the proximal ends of the positioning members 141, thereby causing them to move distally relative to the stop slots 122. The inclined surfaces 142 do not slide because the slots 122 prevent rotational motion of the positioner 140.

In FIG. 6, the spool 10 and shaft 12 have reached a distal position slightly beyond the desired second operational position. At this point, the main spring is further compressed as compared to the proximal position and has resulted in a force Fspring applied to the positioner. Also at this point, the proximal inclined surfaces 142 of the positioning members 141 clear the ends of the stop slots 122, thus freeing the inclined surfaces 142 to slide along the ratchet teeth 132, which causes the positioner 140 to rotate. The ratchet teeth 132 and the inclined surfaces 142 are configured so that the amount of rotation corresponds to the circumferential spacing between the first stop slots 122 and the second stop slots 124. At this point the positioner 140 only rotates by half a ratchet tooth pitch, which just puts the tip of the positioning members 141 over on the other side of the wall between the slots. Thus, the rotation causes the positioner 140 to index so that the engagement members 141 are aligned with the second set of stop slots 124. At this point, pressure in the actuation cavity 27 is released, allowing the spool 10 and the spool shaft 12 to translate back in the distal direction. As pressure is released, the positioner inclined surfaces 142 rotate about the inclined surfaces of the stop 120 which brings the positioner 140 to its final rotated position as it is set back against the slots in the stop 120. This motion is stopped, however, when the proximal ends 142 of the engagement members 141 are fully received into the second stop slots 124 as shown in FIG. 7. At this point, the spool 10 is in its desired second operational position. A force Fspring is created by the main spring and acting on the positioner to keep it fully received in the second stop slots 124.

As hydraulic pressure is again applied and released in the actuation cavity 27, the process repeats, with the distal movement of the spool 10 and shaft 12 causing the positioner engagement members 141 to disengage from the second stop slots 124, which allows the positioner 140 to rotate/index back to alignment with the first stop slots 122. Release of the hydraulic pressure allows the retraction of the spool 10 in the proximal direction until the positioner engagement members 141 engage the base of the first stop slots 122. The spool valve 5 is then back in its first operational position.

Figure 8:
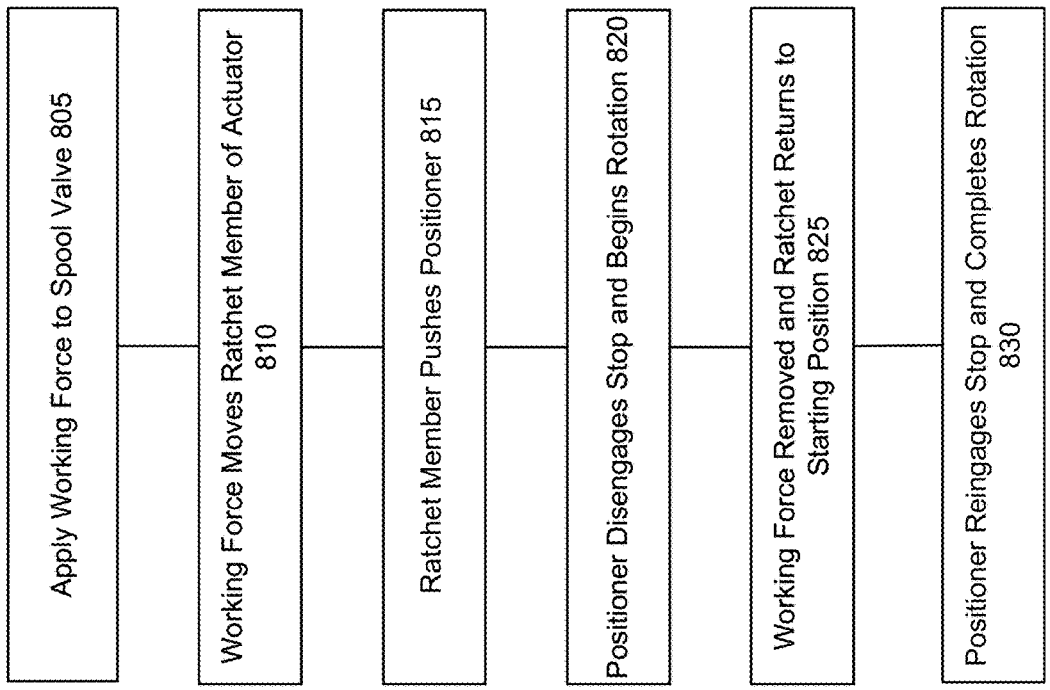
FIG. 8 is a flow diagram illustrating a method of using a spool valve actuator consistent with certain embodiments of the present disclosure.

FIG. 8 is a flow chart describing the operation of the spool valve actuator that was previously described in FIGS. 5-7. At step 805, a working force may be applied to the spool valve. This working force may be translated to the spool valve actuator at step 810. More specifically, this working force may be translated through a spool valve shaft to internal components of the spool valve actuator. The spool valve shaft may move axially, thereby causing axial movement of a ratcheting member of the spool valve actuator assembly that is attached to the spool valve shaft. Upon sufficient axial movement of the ratcheting member, it may engage with and push against a positioner at 815. As a result of the ratcheting member pushing axially against the positioner, the positioner may also move axially in the same direction as the ratcheting member and away from a stop at the based of the spool valve actuator. The axial movement of the positioner away from the stop may cause the positioner to disengage with a plurality of circumferentially space slots in the stop. These slots may prevent rotation of the positioner. The engagement of the ratcheting member with the positioner may be on angled teeth that tends to cause relative rotation due to sliding of the teeth surfaces against each other. As the positioner disengages the slots of the stop at 820, the interface between the ratcheting member teeth and positioner teeth may cause the positioner to rotate as the teeth slide against each other. At 825, the working force may be removed from the spool valve. Removal of the working force may cause the spool valve shaft to return to its initial (e.g., rest) position. This may also cause the ratcheting member to return to its initial position. As the ratcheting member returns to its initial position, the positioner may follow the ratcheting member axially toward the stop. At 830, the positioner may move far enough axially to reengage the stop. However, due to the rotation caused by the engagement of the ratcheting member teeth with the positioner teeth, the positioner may no longer line up with the circumferentially space slots in the stop. Instead, the positioner may line up with a second set of circumferentially space slots in the stop that hold the positioner in a different axial orientation from the first set of slots. In this way, the spool valve axis may be held at a different axial position. The second set of slots in the stop may include inclined plane surfaces (i.e., ramps or teeth) on which the positioner engages thereby causing further relative rotation of the positioner prior to aligning with the second set of slots in the stop (see 124 in FIG. 4).

It will be understood that the relative sizes, dimensions and pressure required to actuate and the distance between the two stop positions are all application specific. It will also be understood that the actuator is not limited to two actuation positions. For example, three axial spool locations may be maintained by configuring the stop with three sets of slots spaced at regular circumferential intervals. Any number of positions may be achieved by adding sets of slots to the stop at regularly spaced circumferential intervals.

The present invention solves the problem of operating a spool valve and maintaining proper spool positioning while being subjected operational back pressure without the need for continuous pilot pressure or a separate control line. The invention provides a significant benefit in that actuation pressure does not need to be continuously maintained, thus significantly increasing the reliability and safety of the device.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A spool valve actuator, comprising:
   a cylindrical actuator case connected to a proximal end of a spool valve and oriented coaxially with a spool axis and configured to house an indexing mechanism and a main spring each oriented coaxially with the spool axis and having passage for a spool valve shaft along the spool axis, the indexing mechanism comprising:
   a stop comprising:
      a disc-shaped base member and a distally extending cylindrical body member, the base member fixedly attached to a proximal end of the cylindrical actuator case;
      an internal passageway in the body member configured to slidably receive a ratchet member;
      a first set of slots of a first length in the body member at regular circumferential distances;
      a second set of slots of a second length in the body member at regular circumferential distances offset from the first set of slots; and
      both the first and second set of slots configured to slidably receive a proximal portion of a positioner;
   the ratchet member comprising:
      a cylindrical body slidably attached to the spool valve shaft, disposed within the stop, and keyed to the stop to prevent relative rotation between the ratchet member and the stop;
      a distal edge comprising a plurality of distally facing teeth configured to engage the proximal portion of the positioner when the ratchet is moved in a distal direction along the spool axis;
   the positioner comprising;
      a base portion configured to engage an inside wall of the cylindrical actuator case; and
      a proximal edge comprising a plurality of extending positioning members configured to engage with both the distally facing teeth of the ratchet member and the first and second sets of slots in the stop.

2. The spool valve actuator of claim 1, wherein the base portion of the positioner is configured for slidable translation and rotation within the cylindrical actuator case.

3. The spool valve actuator of claim 1, wherein a resting state comprises the extending positioning members of the positioner engaged with either the first or second set of slots in the stop.

4. The spool valve actuator of claim 1, wherein upon activation of the spool valve, the ratchet member extends distally upon the spool valve axis until the distally facing teeth of the ratchet member engage the plurality of positioning members, causing the plurality of positioning members to disengage the first or second set of slots on the stop.

5. The spool valve actuator of claim 4, wherein engagement of the extending positioning members of the positioning member with the distally facing teeth of the ratchet member is configured to cause sliding of the surfaces against each other, further causing the positioning member to rotate relative to the stop.

6. The spool valve actuator of claim 5, wherein the rotation of the positioning member is sufficient to align the positioning members of the positioner with the opposite of the first or second stop slot from where the positioner was oriented upon activation of the spool valve.

7. The spool valve actuator of claim 6, wherein upon a deactivation of the spool valve, the positioning members of the positioner slide into contact with a next indexed slot of the stop.

8. The spool valve actuator of claim 1, further comprising a stop collar fixedly mounted to the spool valve shaft and configured to prevent relative axial motion between the positioner and the spool valve shaft.

9. The spool valve actuator of claim 1, wherein the ratchet member and positioner further comprise:
 a ratchet spring installed coaxially with the spool valve axis and between adjacent portions of the ratchet member and positioner.

10. The spool valve actuator of claim 9, wherein the ratchet spring is configured to provide a bias force sufficient to maintain physical separation between the ratchet member and the positioner.

11. The spool valve actuator of claim 1, wherein the ratchet member is positioned such that the distally facing teeth are rotated by one-half of a tooth pitch relative to the positioner when the positioner is engaged with either the first or second set of slots in the stop.

12. The spool valve actuator of claim 1, further comprising one or more additional set of stop slots, each of the one or more additional set of stop slots having a unique length in the body member at regular circumferential distances offset from the first set of slots, the second set of slots, and any other of one or more additional set of stop slots.

13. A method for activating and locking a spool valve, comprising:
 applying a working force to spool valve;
 translating the working force, through a spool valve shaft attached to the spool valve, to a spool valve actuator in a cylindrical actuator case connected to a proximal end of the spool valve and oriented coaxially with a spool axis, and comprising an indexing mechanism and main spring;
 moving the spool valve shaft in a distal direction along the spool axis, such axial movement causing:
  moving of a ratchet member slidably attached to the spool valve shaft in the distal direction along the spool axis, away from a stop fixed to a proximal end of the cylindrical actuator case, wherein the ratchet member is keyed to the stop to prevent relative rotation between the ratchet member and the stop;
  engaging, via the moving of the ratchet member, a distal edge of the ratchet member comprising a plurality of distally facing teeth with a proximal portion of a positioner, the proximal portion comprising a plurality of extending positioning members configured to engage the distally facing teeth of the ratchet member;
 moving, as a result of the engagement of the ratchet member and positioner, the positioner in the distal direction along the spool axis and away from the stop;
 rotating, as a result of the engagement of the ratchet member and positioner, the positioner relative to the stop;
 moving, as a result of removal of the working force, the positioner in a proximal direction along the spool axis toward the stop;
 engaging, via the moving of the positioner in the proximal direction, the positioning members of the proximal portion with one of a first set of slots of a first length in the stop at regular circumferential distances and a second set of slots of a second length in the stop at regular circumferential distances offset from the first set of slots.

14. The method of claim 13, wherein a base portion of the positioner is configured for slidable translation and rotation within the cylindrical actuator case.

15. The method of claim 13, wherein a resting state comprises the extending positioning members of the positioner engaged with either the first or second set of slots in the stop.

16. The method of claim 13, wherein the moving, as a result of the engagement of the ratchet member and positioner, the positioner in the distal direction along the spool axis and away from the stop causes the plurality of positioning members to disengage the first or second set of slots on the stop.

17. The method of claim 13, wherein the rotating, as a result of the engagement of the ratchet member and positioner, the positioner relative to the stop is sufficient to align the positioning members of the positioner with the opposite of the first or second stop slot from where the positioner was oriented upon applying the working force to spool valve.

18. The method of claim 17, wherein upon removal of the working force the positioning members of the positioner slide into contact with a next indexed slot of the stop.

19. The method of claim 13, wherein the ratchet member and positioner include a ratchet spring installed coaxially with the spool valve axis and between adjacent portions of the ratchet member and positioner and is configured to provide a bias force sufficient to maintain physical separation between the ratchet member and the positioner under a steady state.

20. The method of claim 19, wherein the working force is sufficient to overcome the bias force and cause the engaging of the distal edge of the ratchet member with the proximal portion of the positioner.

21. The method of claim 13, wherein the ratchet member is positioned such that the distally facing teeth are rotated by one-half of a tooth pitch relative to the positioner when the positioner is engaged with either the first or second set of slots in the stop.

* * * * *